(12) United States Patent
Abfall et al.

(10) Patent No.: US 11,619,424 B2
(45) Date of Patent: Apr. 4, 2023

(54) GEOTHERMAL HEAT CONTAINMENT BARRIER

(71) Applicant: PDQ MAZOO, LLC, Northbrook, IL (US)

(72) Inventors: Tony Abfall, Mount Prospect, IL (US); Richard Mazursky, Northbrook, IL (US); Marvin Barsky, Chicago, IL (US)

(73) Assignee: PDQ MAZOO, LLC, Northbrook, IL (US)

( * ) Notice: Subject to any disclaimer, the term of this patent is extended or adjusted under 35 U.S.C. 154(b) by 310 days.

(21) Appl. No.: 17/174,462

(22) Filed: Feb. 12, 2021

(65) Prior Publication Data

US 2021/0254863 A1 Aug. 19, 2021

Related U.S. Application Data

(60) Provisional application No. 62/976,112, filed on Feb. 13, 2020.

(51) Int. Cl.
| | | |
|---|---|---|
| *E03B 7/12* | (2006.01) | |
| *F24T 50/00* | (2018.01) | |
| *F16L 53/32* | (2018.01) | |
| *F17D 5/00* | (2006.01) | |

(52) U.S. Cl.
CPC ............. *F24T 50/00* (2018.05); *E03B 7/12* (2013.01); *F16L 53/32* (2018.01); *F17D 5/00* (2013.01)

(58) Field of Classification Search
CPC ......... F16L 59/15; F16L 59/02; F16L 59/021; F16L 59/022; F16L 59/026; F16L 59/028;
(Continued)

(56) References Cited

U.S. PATENT DOCUMENTS

| | | | | |
|---|---|---|---|---|
| 596,062 A | * | 12/1897 | Firey | .......................... E03B 7/10 138/28 |
| 2,599,325 A | * | 6/1952 | Fritzberg | ................ F28F 13/12 138/28 |

(Continued)

OTHER PUBLICATIONS

PCT International Preliminary Report on Patentability and Written Opinion of the ISA for International Application No. PCT/US2021/017779 dated Aug. 11, 2022, 5 pages.

(Continued)

*Primary Examiner* — Patrick F Brinson
(74) *Attorney, Agent, or Firm* — McAndrews, Held & Malloy, Ltd.

(57) ABSTRACT

A geothermal heat containment barrier operable to be manipulated through an opening of a vault by at least partially folding the geothermal heat containment barrier, and positioned substantially horizontally against walls of the vault to reduce heat transfer through the barrier is provided. The barrier includes a central insulating core, a flexible outer frame, and an outer sealing trim. The central insulating core includes top and bottom outer surfaces and a perimeter edge. The central insulating core includes and/or contains an insulating material. The flexible outer frame has a shape memory and includes at least one flexible component having ends together such that the flexible outer frame is continuous and closed. The outer sealing trim is attached to the top and bottom outer surfaces and wraps around the perimeter edge of the central insulating core. The outer sealing trim is operable to press against the wall of the vault.

20 Claims, 9 Drawing Sheets

(58) Field of Classification Search
CPC ....... F16L 25/029; F16L 11/121; F16L 55/24; E03B 7/12
USPC .................................................. 138/32, 149
See application file for complete search history.

(56) References Cited

U.S. PATENT DOCUMENTS

| | | | | |
|---|---|---|---|---|
| 2,821,261 | A * | 1/1958 | Vixler | F16L 55/24 96/17 |
| 4,213,487 | A | 7/1980 | Funk et al. | |
| 4,780,347 | A | 10/1988 | Cohen | |
| 6,119,729 | A * | 9/2000 | Oberholzer | E03B 7/10 138/28 |
| 6,338,364 | B1 * | 1/2002 | Mendenhall | E03B 7/10 138/28 |
| 7,650,911 | B2 * | 1/2010 | Follett | F16L 55/02 138/108 |
| 7,967,029 | B2 * | 6/2011 | Baur | H01M 8/04171 138/33 |
| 8,555,929 | B2 * | 10/2013 | Ertel | F16L 59/024 138/116 |
| 2016/0169419 | A1 | 6/2016 | Shumate | |
| 2018/0023222 | A1 | 1/2018 | Zhang et al. | |
| 2019/0331286 | A1 | 10/2019 | Parks et al. | |

OTHER PUBLICATIONS

PCT International Search Report and Written Opinion of the International Search Authority for International Application Mo. PCT/US2021/017779 dated Apr. 28, 2021, 6 pages.

\* cited by examiner

GEOTHERMAL HEAT CONTAINMENT BARRIER

CROSS-REFERENCE TO RELATED APPLICATIONS/INCORPORATION BY REFERENCE

The present application claims priority under 35 U.S.C. § 119(e) to provisional application Ser. No. 62/976,112 filed on Feb. 13, 2020, entitled "GEOTHERMAL HEAT CONTAINMENT BARRIER." The above referenced provisional application is hereby incorporated herein by reference in its entirety.

FIELD

The present disclosure relates to systems and methods for preventing pipes and meters carrying fluid from freezing and/or from being exposed to extreme heat. More specifically, the present disclosure relates to a geothermal heat containment barrier for installation in underground vaults to trap geothermal heat in the vicinity of water meters and pipes and/or to otherwise reduce heat transfer between air above the geothermal heat containment barrier and air trapped below the geothermal heat containment barrier.

BACKGROUND

Clean, potable water is needed for survival. Typically, water may be available through underground pipes that distribute the water on demand to consumers and business. The water is metered as it is distributed from a main water supply to end users via pipes. The meters may measure an amount of water provided to the end user such that a fee may be charged to the end user based on the amount of water provided. Underground vaults of various shapes, diameters, sizes, widths, heights and depths may contain the pipes and meters. For example, some vaults have narrow openings with a widening of the vault below. The depth of the pipes and meters that intersect in the vault may vary. The vaults are occasionally opened so the meter can be read to establish an amount of water provided to end users. Alternatively, the amount of water provided to end users may be sent electronically to the surface, such as via an antenna attached to the meter. Underground pipes and meters have the tendency to freeze in cold climates if the pipes and meters are not properly installed, become aged, are exposed to severe weather, and the like. Frozen pipes and meters may burst, causing the water supply to be cut off to users, which may cause substantial inconvenience and considerable expense to repair.

There have been attempts to prevent the water from freezing but without success. These attempts have suffered from problems, such as expensive materials and labor, difficult installation, expensive heating solutions (e.g., solar energy), and/or otherwise have been ineffective at preventing meters and pipes from freezing. Variations in vault design, sizes, etc. may also make it difficult to provide a consistent, universal solution.

Further limitations and disadvantages of conventional and traditional approaches will become apparent to one of skill in the art, through comparison of such systems with some aspects of the present disclosure as set forth in the remainder of the present application.

SUMMARY

Certain embodiments provide a geothermal heat containment barrier, substantially as shown in and/or described in connection with at least one of the figures.

These and other advantages, aspects and novel features of the present disclosure, as well as details of an illustrated embodiment thereof, will be more fully understood from the following description and drawings.

DETAILED DESCRIPTION

Figure 1:
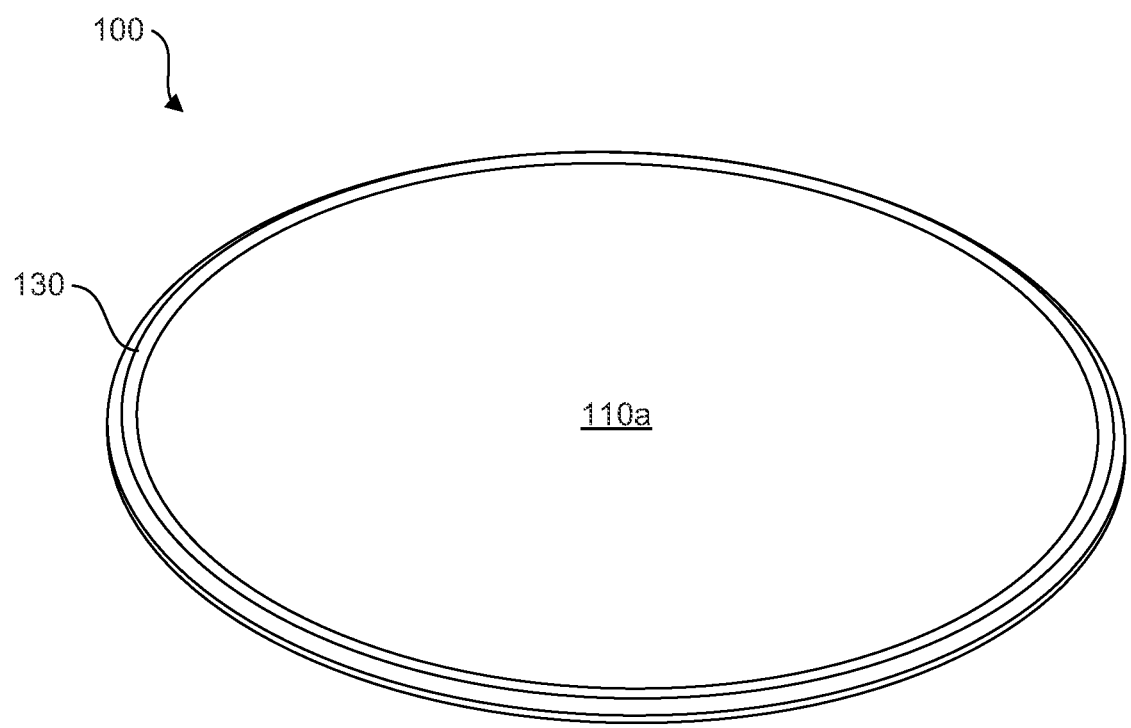
FIG. 1 depicts a perspective view of an exemplary ellipse-shaped geothermal heat containment barrier, in accordance with various embodiments.

Various embodiments of the present disclosure provide a geothermal heat containment barrier positionable in a horizontal orientation against walls of a vault housing meters, pipes carrying fluid, and/or any equipment that may be sensitive to extreme heat and/or cold (e.g., gauges, sensing devices, measuring instruments, reinforcing cables, wells, reservoirs, pools, and the like). The geothermal heat containment barrier may be flexible to allow the barrier to be folded to traverse a vault opening and includes a shape-memory to expand to an original, unfolded shape once released inside of the vault. Aspects of the present disclosure provide a geothermal heat containment barrier that contains geothermal heat below the geothermal heat containment barrier when properly positioned in a vault to prevent meters, pipes, and/or other temperature-sensitive equipment housed in the vault below the geothermal heat containment barrier from being exposed to extreme cold in cold outdoor temperatures and/or from freezing if the equipment is carrying fluid. Various embodiments provide a geothermal heat containment barrier that prevents pipes, meters, and/or other temperature-sensitive equipment housed in the vault below the geothermal heat containment barrier from being exposed to extreme heat in hot outdoor temperatures.

The foregoing summary, as well as the following detailed description of certain embodiments will be better understood when read in conjunction with the appended drawings. It should be understood that the various embodiments are not limited to the arrangements and instrumentality shown in the drawings. It should also be understood that the embodiments may be combined, or that other embodiments may be utilized and that structural changes may be made without departing from the scope of the various embodiments of the present disclosure. The following detailed description is, therefore, not to be taken in a limiting sense.

As used herein, an element or step recited in the singular and proceeded with the word "a" or "an" should be understood as not excluding the plural of the elements or steps, unless such exclusion is explicitly stated. Furthermore, references to "an embodiment," "one embodiment," "a representative embodiment," "an exemplary embodiment," "various embodiments," "certain embodiments," "aspects of the present disclosure," and the like are not intended to be interpreted as excluding the existence of additional embodiments that also incorporate the recited features. Moreover, unless explicitly stated to the contrary, embodiments "comprising," "including," or "having" an element or a plurality of elements having a particular property may include additional elements not having that property.

As used herein, an ellipse-shaped element includes oval and circular elements. As used herein, a rectangular element is a quadrilateral with four right angles (including square-shaped elements and elements having a length that is different from a width).

Figure 2:
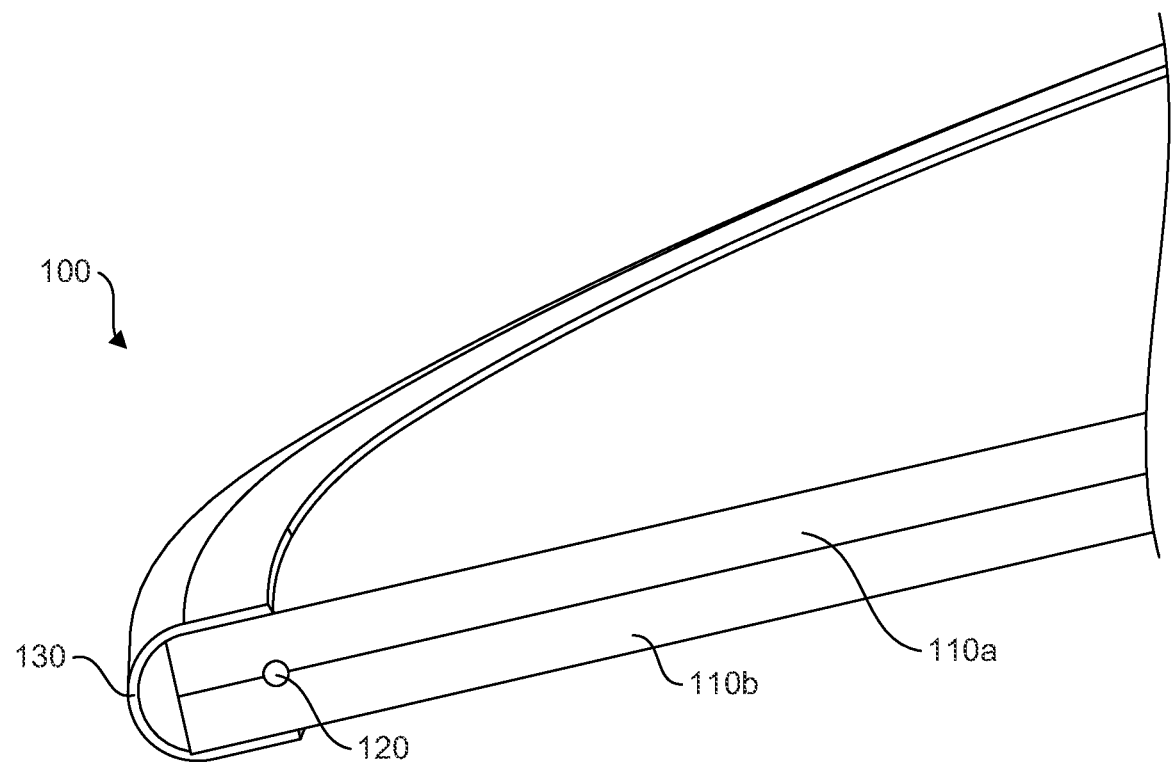
FIG. 2 depicts a perspective, cross-sectional view of an exemplary ellipse-shaped geothermal heat containment barrier, in accordance with various embodiments.
Figure 3:
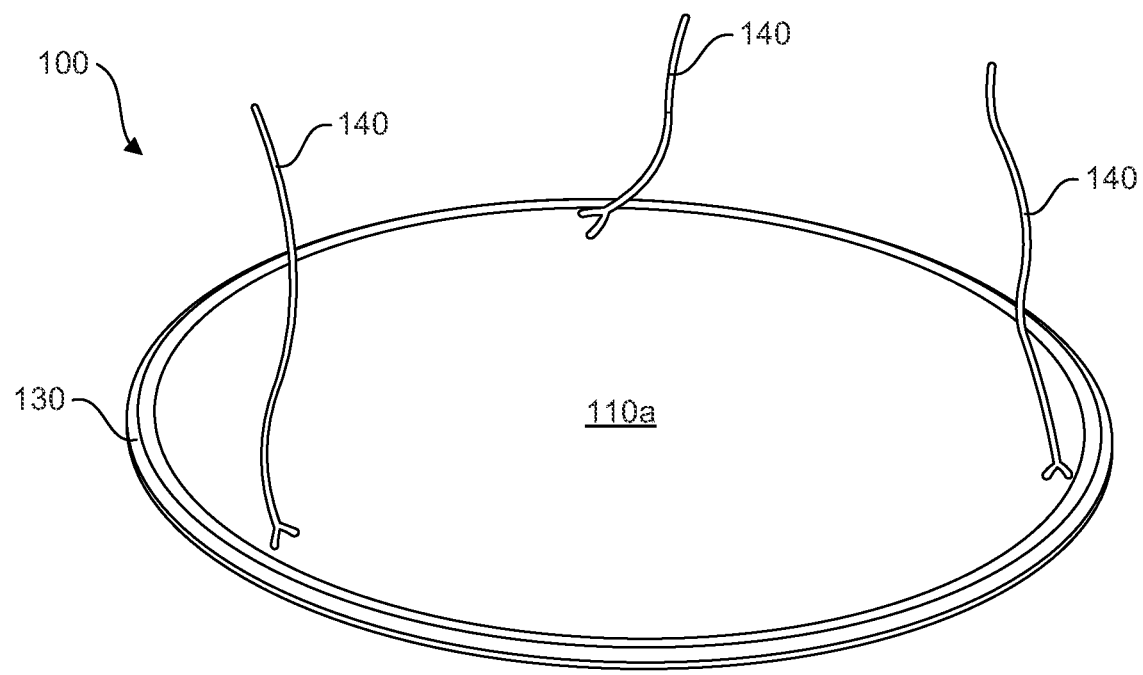
FIG. 3 depicts a perspective view of an exemplary ellipse-shaped geothermal heat containment barrier having tethers, in accordance with various embodiments.

FIG. 1 depicts a perspective view of an exemplary ellipse-shaped geothermal heat containment barrier 100, in accordance with various embodiments. FIG. 2 depicts a perspective, cross-sectional view of an exemplary ellipse-shaped geothermal heat containment barrier 100, in accordance with various embodiments. FIG. 3 depicts a perspective view of an exemplary ellipse-shaped geothermal heat containment barrier 100 having tethers 140, in accordance with various embodiments. Referring to FIGS. 1-3, a geothermal heat containment barrier 100 comprises a central insulating core 110a, 110b and a flexible outer frame 120.

Figure 4:
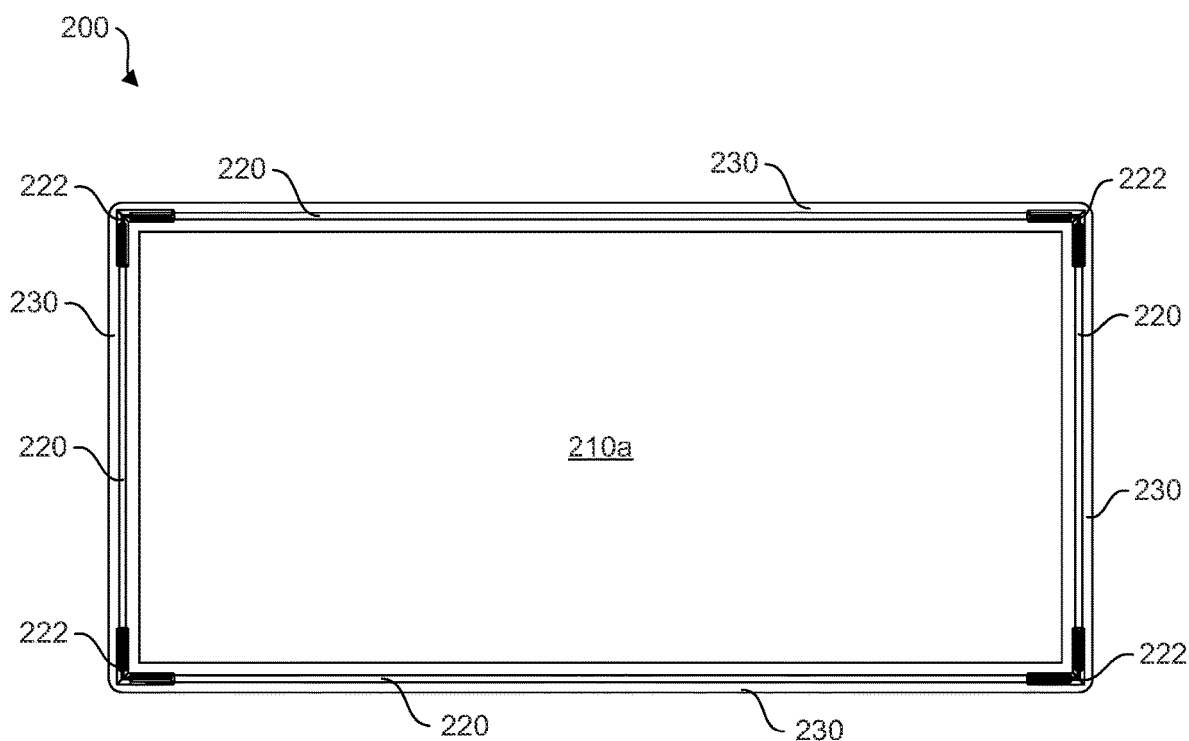
FIG. 4 depicts a semi-transparent plan view of an exemplary rectangular geothermal heat containment barrier, in accordance with various embodiments.
Figure 5:
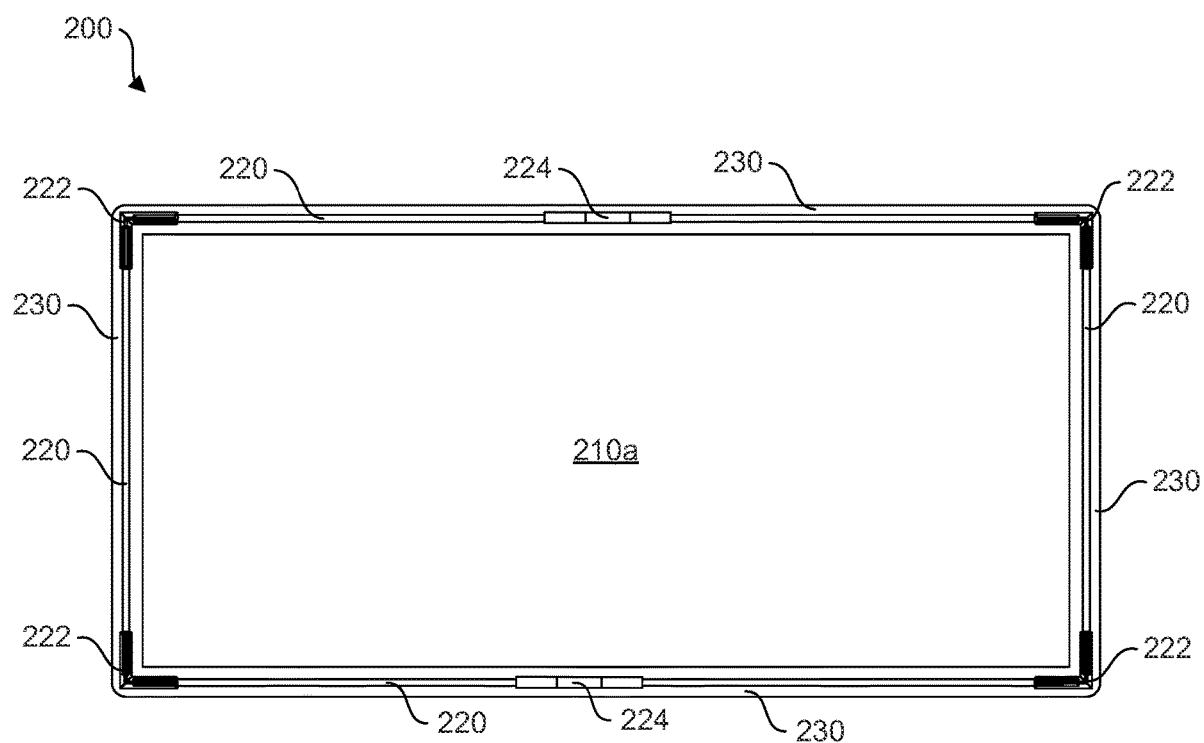
FIG. 5 depicts a semi-transparent plan view of an exemplary rectangular geothermal heat containment barrier having spring hinges, in accordance with various embodiments.
Figure 6:
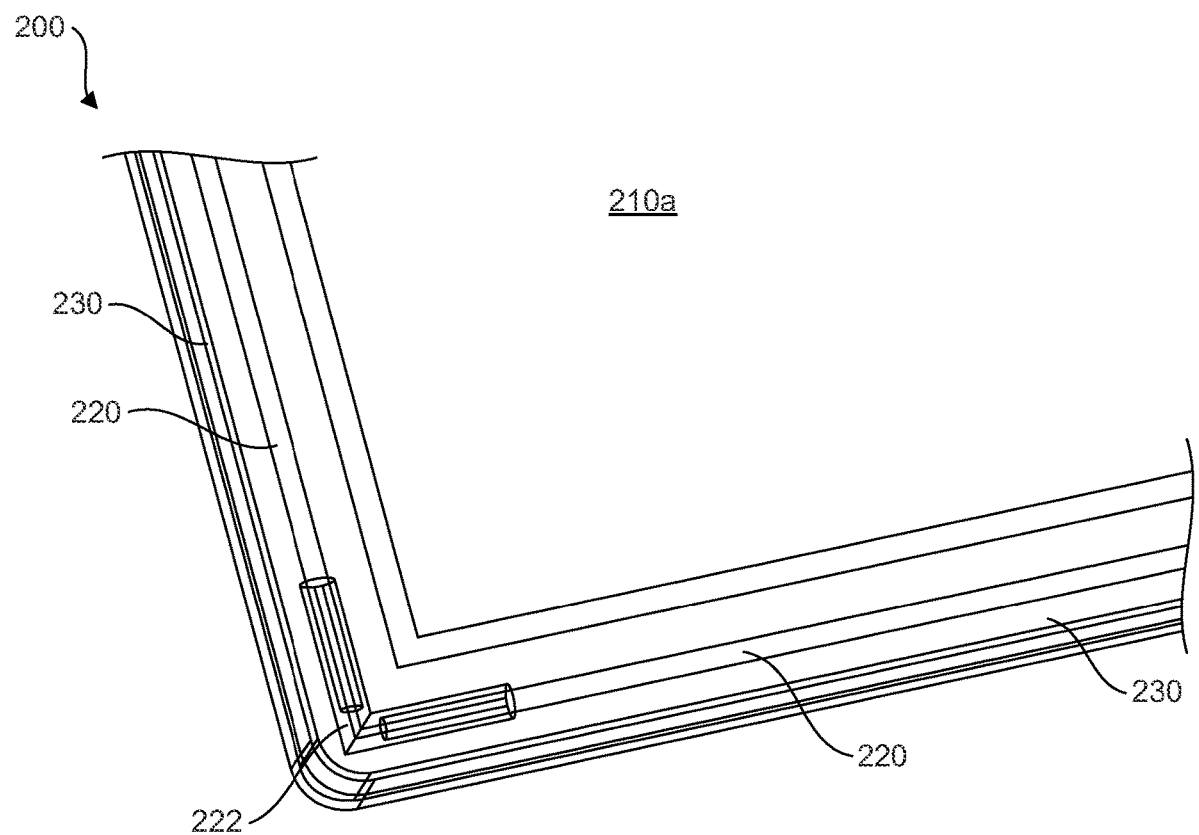
FIG. 6 depicts a semi-transparent perspective view of a portion of an exemplary rectangular geothermal heat containment barrier, in accordance with various embodiments.

The central insulating core 110a, 110b may be made up of one or more flexible layers 110a, 110b of insulating material and/or flexible barrier layers containing insulating material. For example, the central insulating core 110a, 110b may be one or more layers 110a, 110b of quilted foil having air pockets, such as reflective insulation manufactured by REFLECTIX, INC. As another example, aerogel, foam, foam peanuts, spray foam, air, gas, or any suitable insulator may be contained within flexible barrier layers. Flexible barrier layers configured to hold insulating material may be TYVEK, paper, sheeted plastic, biaxially-oriented polyethylene terephthalate (BoPET), flexible polyvinyl chloride (PVC), or any suitable material for containing insulating materials. In another embodiment, the central insulating core 110a, 110b may include non-flexible insulating material, such as a hard foam insulation, that is hinged by one or more spring-loaded hinges at a central portion to allow the central insulating core 110a, 110b to fold under force but return to its original shape once the force is released. The central insulating core 110a, 110b may be water resistant, tear resistant, and/or mold resistant to extend the life of the geothermal heat containment barrier 100. The central insulating core 110a, 110b may be ellipse-shaped (i.e., circular or oval) as shown in FIGS. 1-3 or may be any suitable shape, such as rectangular as shown in FIGS. 4-6. The central insulating core 110a, 110b is operable to prevent or limit heat transfer through the central insulating core 110a, 110b.

The flexible outer frame 120 may be at least one flexible component with a shape memory such that the outer frame 120 may be at least partially folded under a force but returns to an original shape once the force is released. The ends of the flexible component(s) may be coupled to form a continuous/closed flexible outer frame 120. The flexible outer frame 120 may be ellipse-shaped (i.e., circular or oval) as shown in FIGS. 1-3 or may be any suitable shape, such as rectangular as shown in FIGS. 4-6. For example, the ends of the flexible component(s) may be coupled by a crimping loop sleeve, or any suitable attachment mechanism (e.g., fastener, weld, swage, tied, bonded, glued, molded, stamped, wired, etc.) such that the flexible component(s) forms an ellipse-shaped flexible outer frame 120 as shown in FIGS. 1-3. The flexible outer frame 120 may be fiberglass reinforced plastic (FRP), fiberglass, plastic, foam, metal, and/or any suitable flexible material having a shape memory. The flexible outer frame 120 may be hollow and/or solid. The central insulating core 110a, 110b may be attached to the flexible outer frame 120. For example, the outer edge(s) of the central insulating core layer(s) 110a, 110b may form one or more pockets and the flexible outer frame 120 may be secured within and/or attached to the central insulating core 110a, 110b in the pocket(s). As an example, the flexible outer frame 120 may be held within the pocket(s) formed by sewing, stapling, gluing, and/or any suitable process for attaching the flexible outer frame 120 within the pocket(s) surrounding the flexible outer frame 120. FIG. 2 illustrates the flexible outer frame 120 attached to the central insulating core 110a, 110b within a pocket formed by the central insulating core 110a, 110b at the outer edge of the central insulating core 110a, 110b.

In a representative embodiment, the geothermal heat containment barrier 100 may comprise an outer sealing trim 130 attached to the top 110a and bottom 110b outer surfaces and wrapping around the perimeter edge of the central insulating core 110a, 110b. The outer sealing trim 130 may be operable to protect the central insulating core 110a, 110b and provide a surface for pressing against walls of a vault. For example, the outer sealing trim 130 may prevent exposure of air pockets or other insulation material in the central insulating core 110a, 110b. The outer sealing trim 130 may be a durable material, such as canvas, rubber, or any suitable material.

In an exemplary embodiment, the geothermal heat containment barrier 100 may comprise one or more tether rods or straps 140 attached to the flexible outer frame 120 and/or central insulating core 110a, 110b. The tether(s) 140 may be operable to assist with positioning of the geothermal heat containment barrier 100 once the barrier 100 is released to an expanded state within a vault. For example, the geothermal heat containment barrier 100 may be at least partially folded to fit through a vault opening and released to expand the barrier 100. A user may pull one or more of the tethers 140 to orient the barrier against the vault walls in a substantially horizontal orientation to trap heat below the barrier 100 and/or to otherwise reduce heat transfer between air above the geothermal heat containment barrier and air trapped below the geothermal heat containment barrier. For example, in extreme cold conditions, the geothermal heat containment barrier 100 traps warmer air below the barrier 100 to prevent meters and pipes from freezing. As another example, in extreme hot conditions, the geothermal heat containment barrier 100 traps cooler air below the barrier 100 to prevent meters and pipes from being exposed to the extreme heat. The tethers 140 may be canvas or any suitable cloth or plastic straps. Additionally and/or alternatively, the tethers 140 may be a rod formed of fiberglass reinforced plastic (FRP), fiberglass, plastic, metal, and/or any suitable rod material.

In various embodiments, the central insulating core 110a, 110b of the geothermal heat containment barrier 100 may comprise an aperture for reading a meter below the barrier 100 or routing an antenna of a meter through the barrier 100. For example, the central insulating core 110a, 110b may include a flap covering an aperture that may be lifted to perform a meter reading. The flap may be secured by hook and loop fasteners, snaps, and/or any suitable mechanism for detachably coupling a portion of the flap of the central insulating core 110a, 110b. As another example, the central insulating core 110a, 110b may include a transparent piece secured within an aperture of the central insulating core 110a, 110b such that a meter below the barrier 100 may be read by a user above the barrier 100. As another example, the central insulating core 110a, 110b may include a grommet configured to route an antenna through the grommet from the meter below the barrier 100 to above the barrier 100. As another example, a hollow rod may be provided through an aperture in the central insulating core 110a, 110b such that an antenna of the meter may be routed from the meter below the barrier 100 to above the barrier 100. The rod may be provided as a tether 140 that may be operable to assist with positioning the barrier 100 as described above. Other examples may include self-sealing plugs, a slit cut through the central insulating core 110a, 110b, and/or any suitable pass-through mechanism.

FIG. 4 depicts a semi-transparent plan view of an exemplary rectangular geothermal heat containment barrier 200, in accordance with various embodiments. FIG. 5 depicts a semi-transparent plan view of an exemplary rectangular geothermal heat containment barrier 200 having spring hinges 224, in accordance with various embodiments. FIG. 6 depicts a semi-transparent perspective view of a portion of an exemplary rectangular geothermal heat containment barrier 200, in accordance with various embodiments. Referring to FIGS. 4-6, a geothermal heat containment barrier 200 comprises a central insulating core 210a, 210b and a flexible outer frame 220.

The central insulating core 210a, 210b may be made up of one or more flexible layers 210a, 210b of insulating material and/or flexible barrier layers containing insulating material. For example, the central insulating core 210a, 210b may be one or more layers 210a, 210b of quilted foil having air pockets, such as reflective insulation manufactured by REFLECTIX, INC. As another example, aerogel, foam, foam peanuts, spray foam, air, gas, or any suitable insulator may be contained within flexible barrier layers. Flexible barrier layers configured to hold insulating material may be TYVEK, paper, sheeted plastic, biaxially-oriented polyethylene terephthalate (BoPET), flexible polyvinyl chloride (PVC), or any suitable material for containing insulating materials. In another embodiment, the central insulating core 210a, 220b may include non-flexible insulating material, such as a hard foam insulation, that is hinged by one or more spring-loaded hinges at a central portion to allow the central insulating core 210a, 210b to fold under force but return to its original shape once the force is released. The central insulating core 210a, 210b may be water resistant, tear resistant, and/or mold resistant to extend the life of the geothermal heat containment barrier 200. The central insulating core 210a, 210b may be rectangular as shown in FIGS. 4-6, or may be any suitable shape, such as ellipse-shaped (i.e., circular or oval) as shown in FIGS. 1-3. The central insulating core 210a, 210b is operable to prevent or limit heat transfer through the central insulating core 210a, 210b.

The flexible outer frame 220 may be at least one flexible component with a shape memory such that the outer frame 220 may be at least partially folded under a force but returns to an original shape once the force is released. The ends of the flexible component(s) may be coupled to form a continuous/closed flexible outer frame 220. The flexible outer frame 220 may be rectangular as shown in FIGS. 4-6 or any suitable shape, such as ellipse-shaped (i.e., circular or oval) as shown in FIGS. 1-3. For example, the ends of the flexible component(s) may be coupled by ninety (90) degree tube fittings 222, or any suitable attachment mechanism (e.g., fastener, weld, swage, tied, bonded, glued, molded, stamped, wired, etc.) such that the flexible component(s) forms a rectangular flexible outer frame 220 as shown in FIGS. 4-6. The flexible outer frame 220 may be fiberglass reinforced plastic (FRP), fiberglass, plastic, foam, metal, and/or any suitable flexible material having a shape memory. The flexible outer frame 220 may be solid or hollow. The central insulating core 210a, 210b may be attached to the flexible outer frame 220. For example, the outer edge(s) of the central insulating core layer(s) 210a, 210b may form one or more pockets and the flexible outer frame 220 may be secured within and/or attached to the central insulating core 210a, 210b in the pocket(s). As an example, the flexible outer frame 220 may be held within the pocket(s) formed by sewing, stapling, gluing, and/or any suitable process for attaching the flexible outer frame 220 within the pocket(s) surrounding the flexible outer frame 220.

In various embodiments, the flexible outer frame 220 may comprise spring hinges 224 as illustrated in FIG. 5 to facilitate easier folding when a folding force is applied to the ends of the barrier 200. The spring hinges 224 may be attached to adjacent flexible component ends at a central portion of the barrier 200. The spring hinges 224 are operable to return to an original position when the folding force is released. Although not shown in FIGS. 1-3, spring hinges may be similarly incorporated in the flexible outer frame 120 of the ellipse-shaped geothermal heat containment barrier 100

Referring again to FIGS. 4-6, the geothermal heat containment barrier 200 may comprise an outer sealing trim 230 attached to the top 210a and bottom 210b outer surfaces and wrapping around the perimeter edge of the central insulating core 210a, 210b. The outer sealing trim 230 may be operable to protect the central insulating core 210a, 210b and provide a surface for pressing against walls of a vault. For example, the outer sealing trim 230 may prevent exposure of air pockets or other insulation material in the central insulating core 210a, 210b. The outer sealing trim 230 may be a durable material, such as canvas, rubber, or any suitable material.

In an exemplary embodiment, the geothermal heat containment barrier 200 may comprise one or more tether rods or straps attached to the flexible outer frame 220 and/or central insulating core 210a, 210b as described above with respect to FIG. 3. In certain embodiments, the central insulating core 210a, 210b of the geothermal heat containment barrier 200 may comprise an aperture for reading a meter below the barrier 200 or routing an antenna of a meter through the barrier 200 as described above with respect to FIGS. 1-3.

The geothermal heat containment barrier 200 of FIGS. 4-6 may share various characteristics with the geothermal heat containment barrier 100 described above with respect to FIGS. 1-3.

Figure 7:
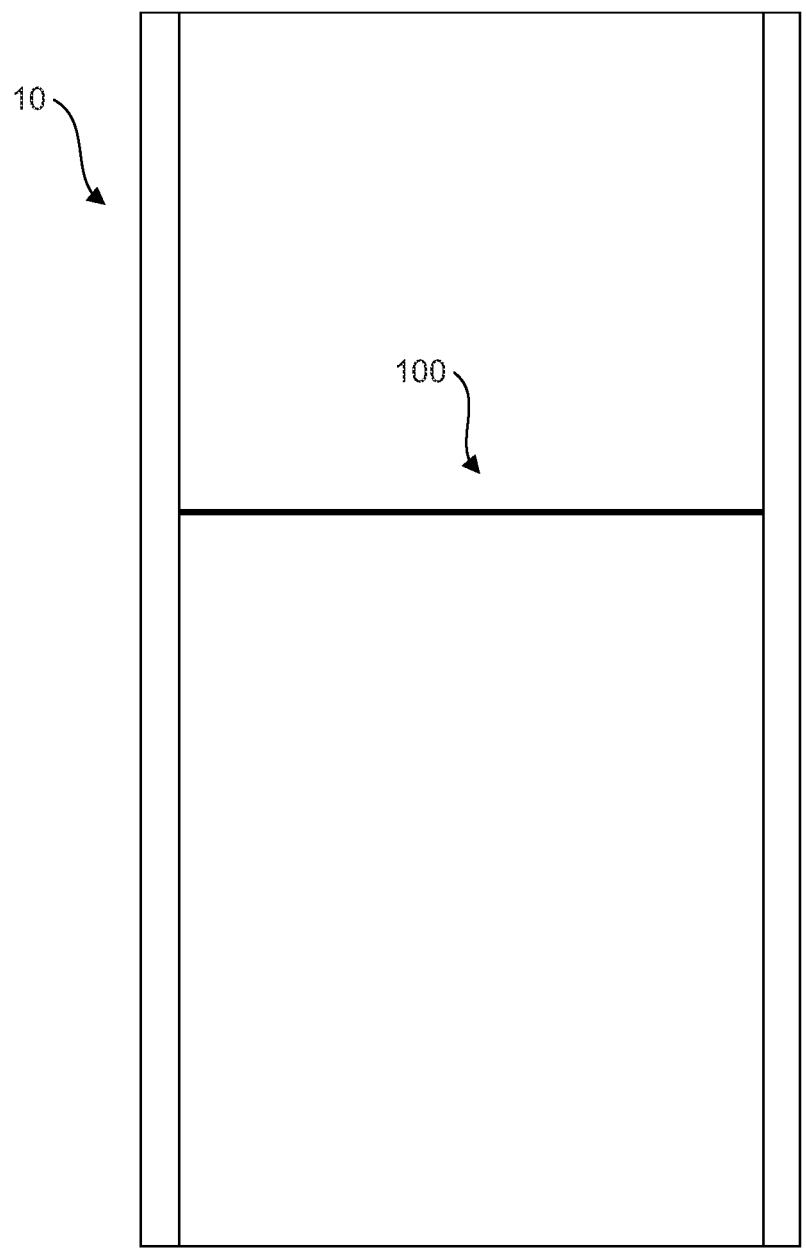
FIG. 7 depicts a side, elevation view of an exemplary ellipse-shaped geothermal heat containment barrier positioned in a vault, in accordance with various embodiments.
Figure 8:
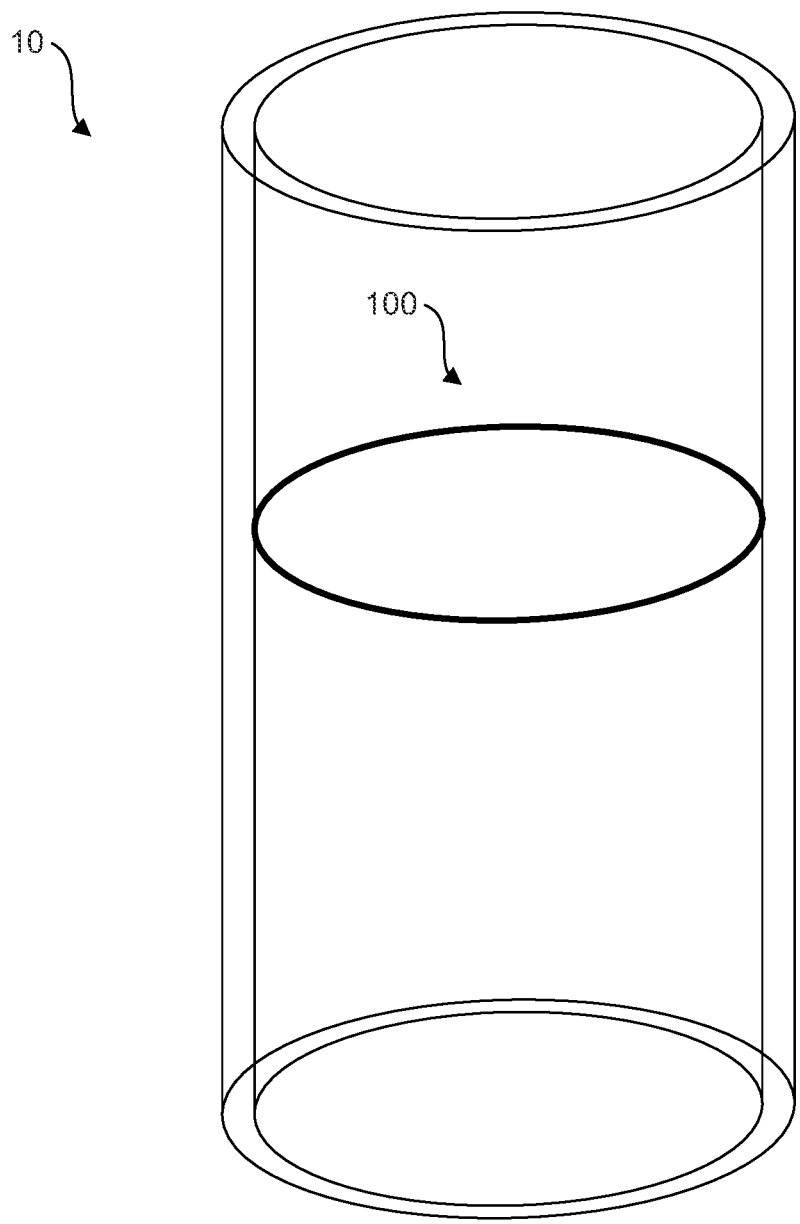
FIG. 8 depicts a perspective view of an exemplary ellipse-shaped geothermal heat containment barrier positioned in a vault, in accordance with various embodiments.
Figure 9:
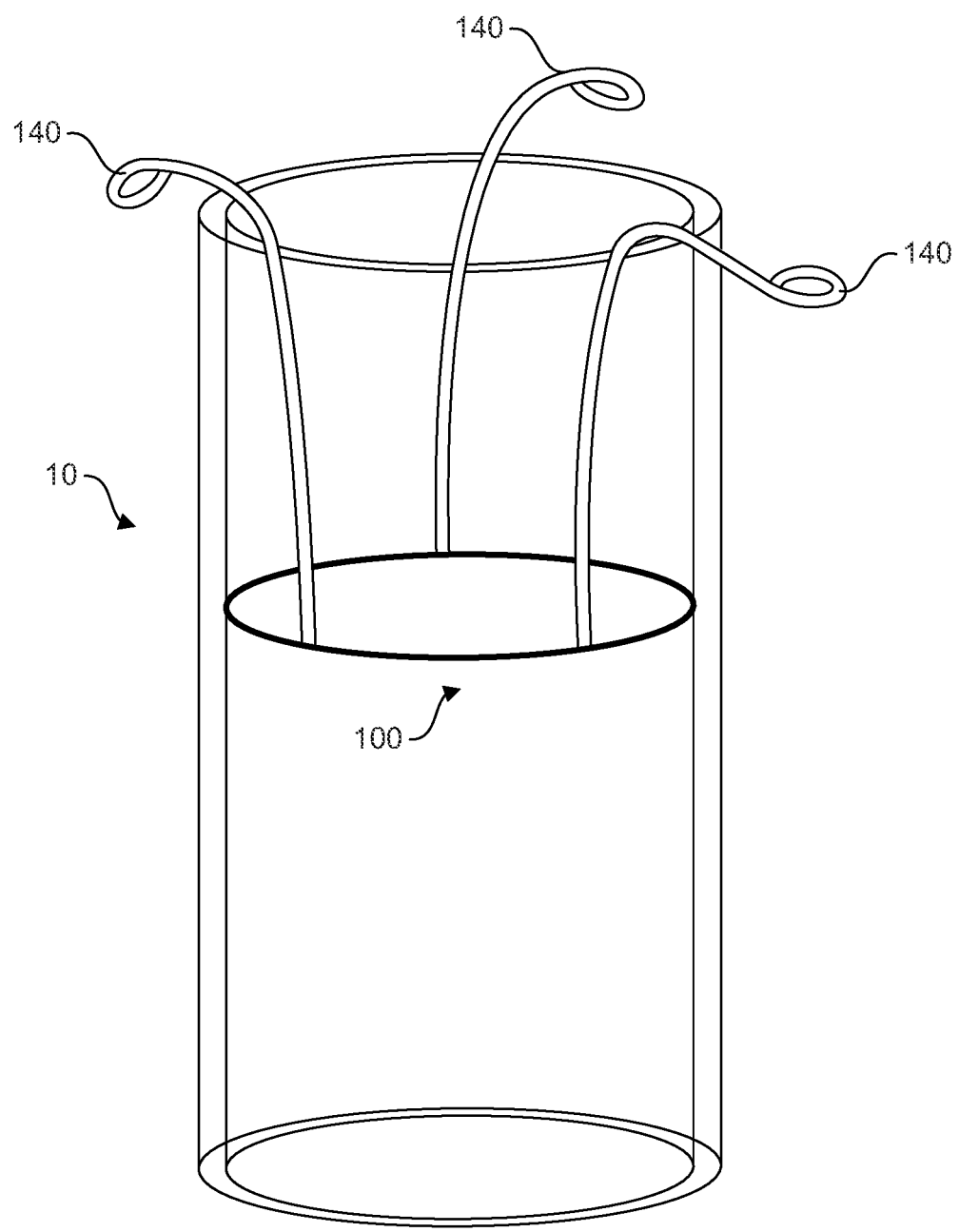
FIG. 9 depicts a perspective view of an exemplary ellipse-shaped geothermal heat containment barrier having tethers and positioned in a vault, in accordance with various embodiments.

FIG. 7 depicts a side, elevation view of an exemplary ellipse-shaped geothermal heat containment barrier 100 positioned in a vault 10, in accordance with various embodiments. FIG. 8 depicts a perspective view of an exemplary ellipse-shaped geothermal heat containment barrier 100 positioned in a vault 10, in accordance with various embodiments. FIG. 9 depicts a perspective view of an exemplary ellipse-shaped geothermal heat containment barrier 100 having tethers 140 and positioned in a vault 10, in accordance with various embodiments. Referring to FIGS. 7-9, a geothermal heat containment barrier 100 is positioned at a horizontal orientation within a vault 10 to capture warm air below the barrier 100. In various embodiments, the barrier 100 may comprise one or more tethers 140 to assist a user outside of the vault 10 with properly positioning the barrier 100 within the vault 10.

In operation, a geothermal heat containment barrier 100, 200 may be selected based on a size and shape of a vault 10. For example, an ellipse-shaped geothermal heat containment barrier 100 may be selected for an ellipse-shaped vault 10 and a rectangular geothermal heat containment barrier 200 may be selected for a rectangular vault. The dimensions of the barrier 100, 200 may be selected to be approximately one (1) inch (i.e., 0.5-2.0 inches) larger than the vault dimensions to provide a pressure fit of the barrier 100, 200 against the walls of the vault 10. The barrier 100, 200 may be at least partially folded if the vault opening is smaller than the vault 10 to place the barrier 100, 200 within the vault 10. The flexible outer frame 120, 220 of the barrier 100, 200 may include a spring hinge 224 to facilitate easier folding. The barrier 100, 200 expands to its original size once the folding pressure is released. If the meter housed in the vault 10 includes an antenna, the antenna may be routed through an aperture in the central insulating core 110a, 110b, 210a, 210b. The aperture may include a grommet, hollow rod, self-sealing plug, slit, and/or any suitable opening through the central insulating core 110a, 110b, 210a, 210b that allows a meter antenna to pass from below the barrier 100, 200 to above the barrier 100, 200. The barrier 100, 200 may be manipulated to a substantially horizontal orientation with durable outer sealing trim 130, 230 of the barrier 100, 200 pressed firmly against the vault walls. In various embodiments, tethers 140 and/or an antenna rod secured to the flexible outer frame 120, 220 and/or central insulating core 110a, 110b, 210a, 210b may be pushed or pulled to assist with manipulating the barrier 100, 200 to a proper orientation.

Geothermal heat exists below the surface of the earth. The greater the depth, the higher temperature of the heat. For example, at four (4) feet deep, the earth's temperature may be approximately forty (40) degrees Fahrenheit (F), while at five (5) feet deep, the temperature may be about fifty-five (55) degrees Fahrenheit (F). The heated air rises in an underground vault toward the earth's surface. The geothermal heat containment barrier 100, 200 positioned above the pipes and meters captures the air below the barrier 100, 200 to create a warm chamber of air that prevents the pipes and meters from freezing in cold outdoor temperatures and/or a cool chamber of air that prevents the pipes and meters from being exposed to extreme heat in hot outdoor temperatures.

Aspects of the present disclosure provide a geothermal heat containment barrier 100, 200 operable to be manipulated through an opening of a vault 10 by at least partially folding the geothermal heat containment barrier 100, 200, and configured to be positioned substantially horizontally against walls of the vault 10 to trap heat below the geothermal heat containment barrier 100, 200. The geothermal heat containment barrier 100, 200 may comprise a central insulating core 110a, 110b, 210a, 210b, a flexible outer frame 120, 220, and an outer sealing trim 130, 230. The central insulating core 110a, 110b, 210a, 210b may comprise a top outer surface, a bottom outer surface, and a perimeter edge. The central insulating core may one or both of comprise or contain an insulating material. The flexible outer frame 120, 220 may have a shape memory. The flexible outer frame may comprise at least one flexible component having ends coupled together such that the flexible outer frame is continuous and closed. The outer sealing trim 130, 230 may be attached to the top outer surface and the bottom outer surface and wrapping around the perimeter edge of the central insulating core 110a, 110b, 210a, 210b. The outer sealing trim 130, 230 may be operable to press against the wall of the vault 10. The central insulating core 110a, 110b, 210a, 210b may surround the flexible outer frame 120, 220 such that the flexible outer frame 120, 220 is not exposed from the central insulating core 110a, 110b, 210a, 210b.

In an exemplary embodiment, the central insulating core 110a, 110b, 210a, 210b may be at least one layer of quilted foil having air pockets. In a representative embodiment, the central insulating core 110a, 110b, 210a, 210b may comprise flexible barrier layers containing the insulating material. In various embodiments, the insulating material may be one or more of aerogel, foam, air, or gas. In certain embodiments, the flexible barrier layers may be one of TYVEK, paper, sheeted plastic, biaxially-oriented polyethylene terephthalate (BoPET), or flexible polyvinyl chloride (PVC). In an exemplary embodiment, the central insulating core 110a, 110b, 210a, 210b and the flexible outer frame 120, 220 may be ellipse-shaped. In a representative embodiment, the ends of the at least one flexible component are coupled by a crimpling loop sleeve. In various embodiments, the flexible outer frame 120, 220 may be one of fiberglass reinforced plastic (FRP), fiberglass, plastic, foam, or metal. In certain embodiments, the central insulating core 110a, 110b, 210a, 210b may comprise a first layer 110a and a second layer 110b. Outer edges of the first layer 110a and the second layer 110b may form one or more pockets. The flexible outer frame 120, 130 may be one or both of attached to or secured within the one or more pockets. In an exemplary embodiment, the outer sealing trim 130, 230 may comprise one of canvas or rubber.

In a representative embodiment, the geothermal heat containment barrier 100, 200 may comprise at least one tether 140 attached to one or both of the flexible outer frame 120, 220 or the central insulating core 110a, 110b, 210a, 210b. The at least one tether 140 may be operable to assist a user with positioning the geothermal heat containment barrier 100, 200 in a substantially horizontal orientation against the walls within the vault 10. In various embodiments, the at least one tether 140 may comprise a tether strap. In certain embodiments, the tether strap may be one of canvas, cloth, or plastic. In an exemplary embodiment, the at least one tether 140 may comprise a tether rod. In a representative embodiment, the tether rod may be formed of one of fiberglass reinforced plastic (FRP), fiberglass, plastic, or metal.

In various embodiments, the central insulating core 110a, 110b, 210a, 210b may comprise non-flexible insulating material hinged by one or more spring-loaded hinges at a central portion of the central insulating core 110a, 110b, 210a, 210b. In certain embodiments, the central insulating core 110a, 110b, 210a, 210b and the flexible outer frame 120, 220 may be rectangular. In an exemplary embodiment, the at least one flexible component is at least four flexible components. The ends of the at least four flexible components are coupled by ninety (90) degree tube fittings 222. In a representative embodiment, the flexible outer frame 120, 220 may comprise spring hinges 224 attached to adjacent flexible component ends at a center portion of the flexible outer frame 120, 220. In various embodiments, the central insulating core 110*a*, 110*b*, 210*a*, 210*b* may comprise an aperture.

As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g.," and "for example" set off lists of one or more non-limiting examples, instances, or illustrations. As utilized herein, a component is "operable" or "configured" to perform a function whenever the component comprises the necessary structure to perform the function, regardless of whether the function is performed.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed.

What is claimed is:

1. A geothermal heat containment barrier operable to be manipulated through an opening of a vault by at least partially folding the geothermal heat containment barrier, and configured to be positioned substantially horizontally against walls of the vault to reduce heat transfer through the geothermal heat containment barrier, the geothermal heat containment barrier comprising:
    a central insulating core comprising a top outer surface, a bottom outer surface, and a perimeter edge, the central insulating core comprising and/or containing an insulating material;
    a flexible outer frame having a shape memory, the flexible outer frame comprising at least one flexible component having ends coupled together such that the flexible outer frame is continuous and closed; and
    an outer sealing trim attached to the top outer surface and the bottom outer surface and wrapping around the perimeter edge of the central insulating core, the outer sealing trim operable to press against the wall of the vault,
    wherein the central insulating core surrounds the flexible outer frame such that the flexible outer frame is not exposed from the central insulating core.

2. The geothermal heat containment barrier of claim 1, wherein the central insulating core is at least one layer of quilted foil having air pockets.

3. The geothermal heat containment barrier of claim 1, wherein the central insulating core comprises flexible barrier layers containing the insulating material.

4. The geothermal heat containment barrier of claim 3, wherein the insulating material is one or more of aerogel, foam, air, or gas.

5. The geothermal heat containment barrier of claim 3, wherein the flexible barrier layers is one of TYVEK, paper, sheeted plastic, biaxially-oriented polyethylene terephthalate (BoPET), or flexible polyvinyl chloride (PVC).

6. The geothermal heat containment barrier of claim 1, wherein the central insulating core and the flexible outer frame are ellipse-shaped.

7. The geothermal heat containment barrier of claim 6, wherein the ends of the at least one flexible component are coupled by a crimpling loop sleeve.

8. The geothermal heat containment barrier of claim 1, wherein the flexible outer frame is one of fiberglass reinforced plastic (FRP), fiberglass, plastic, foam, or metal.

9. The geothermal heat containment barrier of claim 1, wherein the central insulating core comprises a first layer and a second layer, and wherein outer edges of the first layer and the second layer form one or more pockets, the flexible outer frame one or both of attached to or secured within the one or more pockets.

10. The geothermal heat containment barrier of claim 1, wherein the outer sealing trim comprises one of canvas or rubber.

11. The geothermal heat containment barrier of claim 1, comprising at least one tether attached to one or both of the flexible outer frame or the central insulating core, the at least one tether operable to assist a user with positioning the geothermal heat containment barrier in a substantially horizontal orientation against the walls within the vault.

12. The geothermal heat containment barrier of claim 11, wherein the at least one tether comprises a tether strap.

13. The geothermal heat containment barrier of claim 12, wherein the tether strap is one of canvas, cloth, or plastic.

14. The geothermal heat containment barrier of claim 11, wherein the at least one tether comprises a tether rod.

15. The geothermal heat containment barrier of claim 14, wherein the tether rod is formed of one of fiberglass reinforced plastic (FRP), fiberglass, plastic, or metal.

16. The geothermal heat containment barrier of claim 1, wherein the central insulating core comprises non-flexible insulating material hinged by one or more spring-loaded hinges at a central portion of the central insulating core.

17. The geothermal heat containment barrier of claim 1, wherein the central insulating core and the flexible outer frame are rectangular.

18. The geothermal heat containment barrier of claim 17, wherein the at least one flexible component is at least four flexible components, and wherein the ends of the at least four flexible components are coupled by ninety (90) degree tube fittings.

19. The geothermal heat containment barrier of claim 17, wherein the flexible outer frame comprises spring hinges attached to adjacent flexible component ends at a center portion of the flexible outer frame.

20. The geothermal heat containment barrier of claim 1, wherein the central insulating core comprises an aperture.

* * * * *